(12) United States Patent
Ruberg

(10) Patent No.: US 6,785,894 B1
(45) Date of Patent: Aug. 31, 2004

(54) VIRTUAL DEVICE DRIVER

(75) Inventor: Alan T. Ruberg, Foster City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/289,795

(22) Filed: Apr. 9, 1999

(51) Int. Cl.[7] .................................................. G06F 13/10
(52) U.S. Cl. ...................................... 719/321; 719/327
(58) Field of Search ................................ 709/330, 100, 709/103, 229, 223, 321, 325; 719/330, 321, 322, 323, 324, 327; 718/100, 103

(56) References Cited

U.S. PATENT DOCUMENTS 5,452,460 A * 9/1995 Distelberg et al. .......... 709/321
5,809,303 A * 9/1998 Senator ....................... 709/325

OTHER PUBLICATIONS

W. Richard Stevens, Advanced Programming in the Unix Environment 1992, Addison–Wesley Publishing Company, pp. 325 328, 394–402, 615–617 and 631–357.*

* cited by examiner

Primary Examiner—Meng-Al T. An
Assistant Examiner—The Thanh Ho
(74) Attorney, Agent, or Firm—Martine & Penilla, LLP

(57) ABSTRACT

A pseudo device driver is provided for use by an operation system in a virtual desktop computing environment. The driver has two ports, a master port that is opened by the driver application and a slave port accessed by a program. The two ports provide the functionality necessary for supporting the remote device on the terminal. When a program accesses a device coupled to the terminal, the program opens the pseudo device driver's slave port and proceeds as if the device were coupled to a local bus.

17 Claims, 4 Drawing Sheets

US 6,785,894 B1

VIRTUAL DEVICE DRIVER

BACKGROUND OF THE INVENTION

1. Field of the Invention

This invention relates to the field of computer systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, Hotjava and all Java-based trademarks and logos are trademarks or registered trademarks of Sun Microsystems, Inc. in the United States and other countries.

2. Background Art

Computer systems often include additional devices used to provide additional functionality. These devices, often called "peripheral" devices, can include keyboards, printers, scanners, network interface and graphics cards, modems, monitors, cameras, and sound input devices. Generally, a device driver is used to control the peripheral device. In some network environments, the traditional device driver may not be appropriate for an attached device. This problem can be understood by a review of peripheral devices.

Peripheral devices are often connected to a computer system through an expansion bus. An expansion bus allows the processor of a computer system (via software running on the processor), main memory, and other hardware associated with a computer system to control peripheral hardware devices external to the computer system. An expansion bus consists of conductors for data and control signals, along with hardware support logic chips and possibly firmware. There are a variety of expansion buses such as ISA (Industry Standard Architecture), PCI (Peripheral Component Interconnect), S-Bus, VME bus, etc. Each expansion bus defines a certain protocol by which devices that are on the bus are accessed.

A device driver is software used to control a peripheral device that is coupled with the computer system on the bus. A device driver is a program that controls a particular type of device that is attached to your computer. There are device drivers for printers, displays, CD-ROM readers, diskette drives, and so on. Many device drivers are built into an operating system. New device drivers are needed for devices for which the operating system does not already have drivers. A device driver converts the more general input/output instructions of the operating system to messages that the device type can understand. In many computer systems, device drivers exist as a dynamic link library (DLL) file. Since misprogramming of a peripheral on a bus can cause loss of service or system failure, it is customary for device drivers to be run in a protected, or kernel, mode.

FIG. 1 illustrates symbolically the interrelation of devices, device drivers, and application programs. Devices, such as devices A and B, communicate through a bus (such as an expansion bus) to system software. The system software includes device drivers (device driver A and device driver B, respectively) implemented in the system software kernel. Applications can access the devices through the system software kernel and the appropriate device drivers.

A problem can arise where, in some network environments, a peripheral device may not be coupled directly to the computer system through the bus, but rather through a network connection. In those cases, traditional device drivers may not operate correctly to permit operation of the peripheral device, however, the only interface that is provided by the operation system is through a device driver.

SUMMARY OF THE INVENTION

A pseudo device driver is provided for use by an operation system in a virtual desktop computing environment. Where traditional device drivers do not operate correctly to permit operation of a peripheral device, and the only interface that is provided is through a device driver, the present invention provides a virtual device driver to act as an adapter to couple an application to the peripheral device. The pseudo device driver has two ports, a master port that is opened by the driver application and a slave port accessed by a program. The two ports provide the functionality necessary for supporting the remote device on the terminal. When a program accesses a device coupled to the terminal, the program opens the pseudo device driver's slave port and proceeds as if the device were coupled to a local bus.

DETAILED DESCRIPTION OF THE INVENTION

The invention is a method and apparatus for providing a virtual device driver. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Virtual Desktop System Architecture

One environment in which the present invention may be applied is in a virtual desktop system. One example of such a computer system is described in U.S. patent application Ser. No. 09/063,335 filed Apr. 20, 1998 and entitled "Method and Apparatus for Providing a Virtual Desktop System Architecture". In such a system, there is provided a central office metaphor to computing, where features and functions are provided by one or more servers and communicated to an appliance terminal through a network. Data providers are defined as "services" and are provided by one or more processing resources. The services communicate to display terminals through a network, such as Ethernet. The terminals are configured to display data, and to send keyboard, cursor, audio, and video data through the network to the processing server. Functionality is partitioned so that databases, server and graphical user interface functions are provided by the services, and human interface functionality is provided by the terminal. Communication with the terminals from various services is accomplished by converting disparate output to a common protocol. Appropriate drivers are provided for each service to allow protocol conversion. Multiple terminals are coupled to the network. Users can enable their unique session at any one of the terminals by logging in such as by inserting a "smart card" into a card reader. Removing the card disables the session. Re-inserting the card into the same or any other terminal re-enables the session.

In the computer system described above, the interfaces for peripheral devices coupled to the human interface terminal appear over a network protocol and do not involve operating system device drivers in the traditional sense. Therefore, existing device driver software does not operate correctly.

Figure 3:
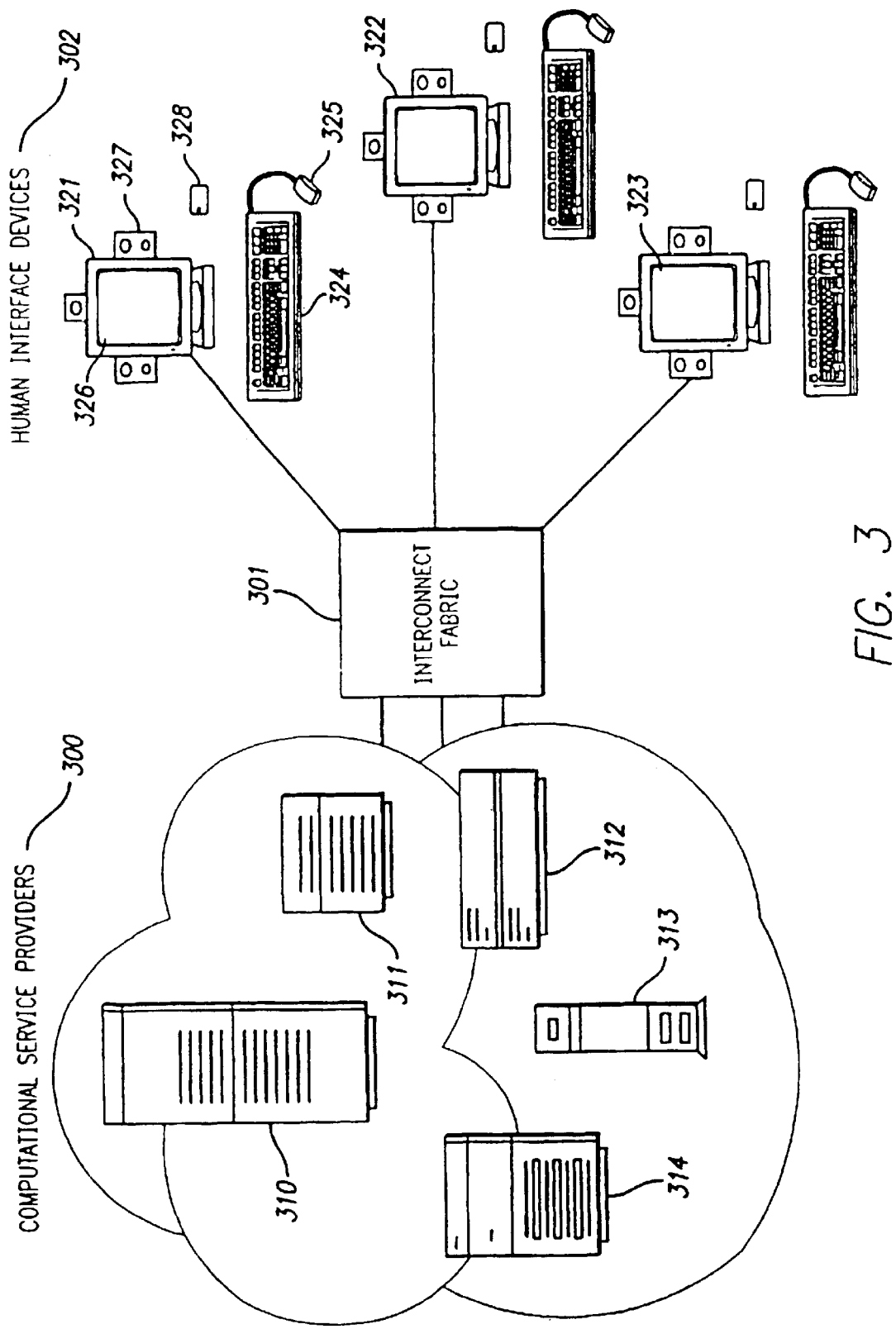
FIG. 3 illustrates the virtual desktop environment of the present invention.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 3. Referring to FIG. 3, the system consists of computational service providers 300 communicating data through interconnect fabric 301 to HIDs 302.

Computational Service Providers

Figure 1:
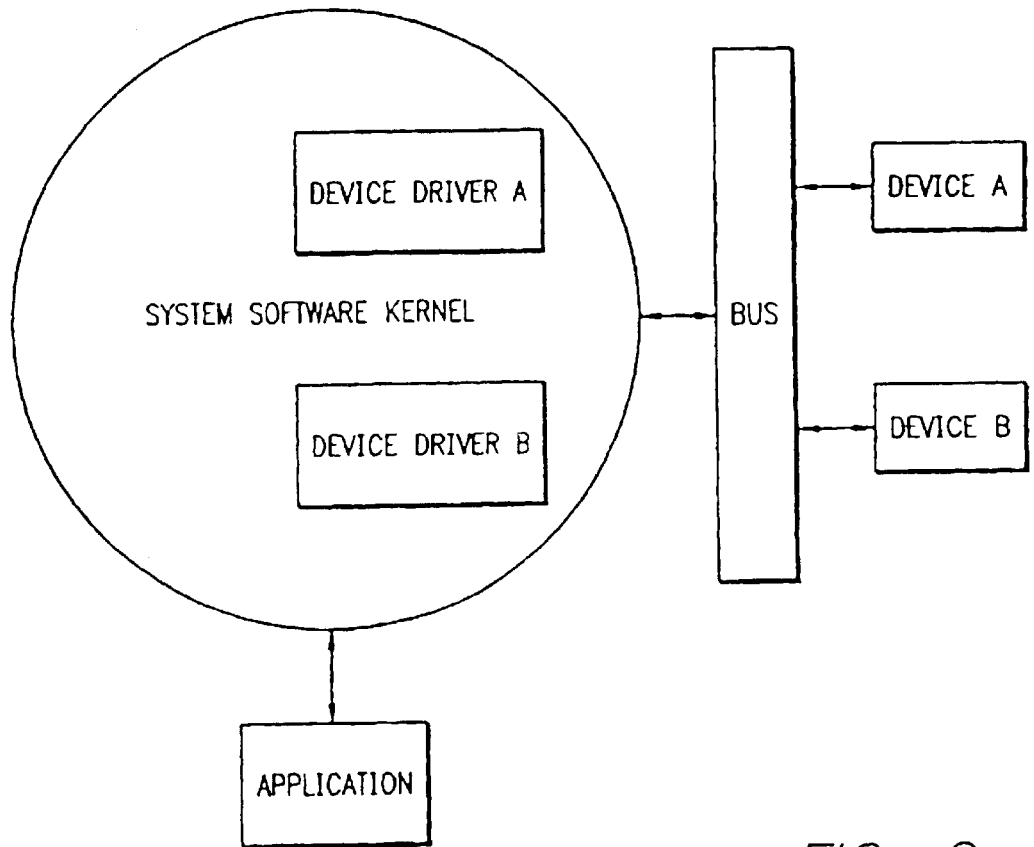
FIG. 1 illustrates the relationship of devices, device drivers, and application programs.

In the HID system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the HIDs and the service is under the control of a common authority or manager. In FIG. 3, the services are found on computers 310, 311, 312, 313, and 314. It is important to note that the central data source can also be providing data that comes from outside of the central data source, such as for example, the internet or world wide web. The data source could also be broadcast entities such as those that broadcast data such as television or radio signals.

Examples of services include X11/Unix services, archived or live audio or video services, Windows NT service, Java™ program execution service, and others. A service herein is a process that provides output data and responds to user requests and input.

It is the responsibility of the service to handle communications with the HID that is currently being used to access the given service. This involves taking the output from the computational service and converting it to a standard protocol for the HID. This data protocol conversion is handled in one embodiment of the invention by a middleware layer, such as the X11 server, the Microsoft Windows interface, a video format transcoder, the OpenGL interface, or a variant of the java.awt.graphics class) within the service producer machine. The service machine handles the translation to and from the virtual desktop architecture wire protocol.

In an embodiment of the invention, each service is provided by a computing device optimized for its performance. For example, an Enterprise class machine could be used to provide X11/Unix service, a Sun MediaCenter could be used to provide video service, a Hydra based NT machine could provide applet program execution service.

The service producing computer systems connect directly to the HIDs through the interconnect fabric. It is also possible for the service producer to be a proxy for another device providing the computational service, such as a database computer in a three tiered architecture, where the proxy computer might only generate queries and execute user interface code.

Interconnection Fabric

In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between the HID and the services being accessed. One embodiment contemplates a single-level, switched network, with cooperative (as opposed to competing) network traffic. Dedicated or shared communications interconnects may be used in the present invention.

Human Interface Devices

The HID is the means by which users access the computational services provided by the services. FIG. 3 illustrates HIDs 321, 322, and 323. A HID consists of a display 326, a keyboard 324, mouse 325, and audio speakers 327. The HID includes the electronics need to interface these devices to the interconnection fabric and to transmit to and receive data from the services.

Figure 4:
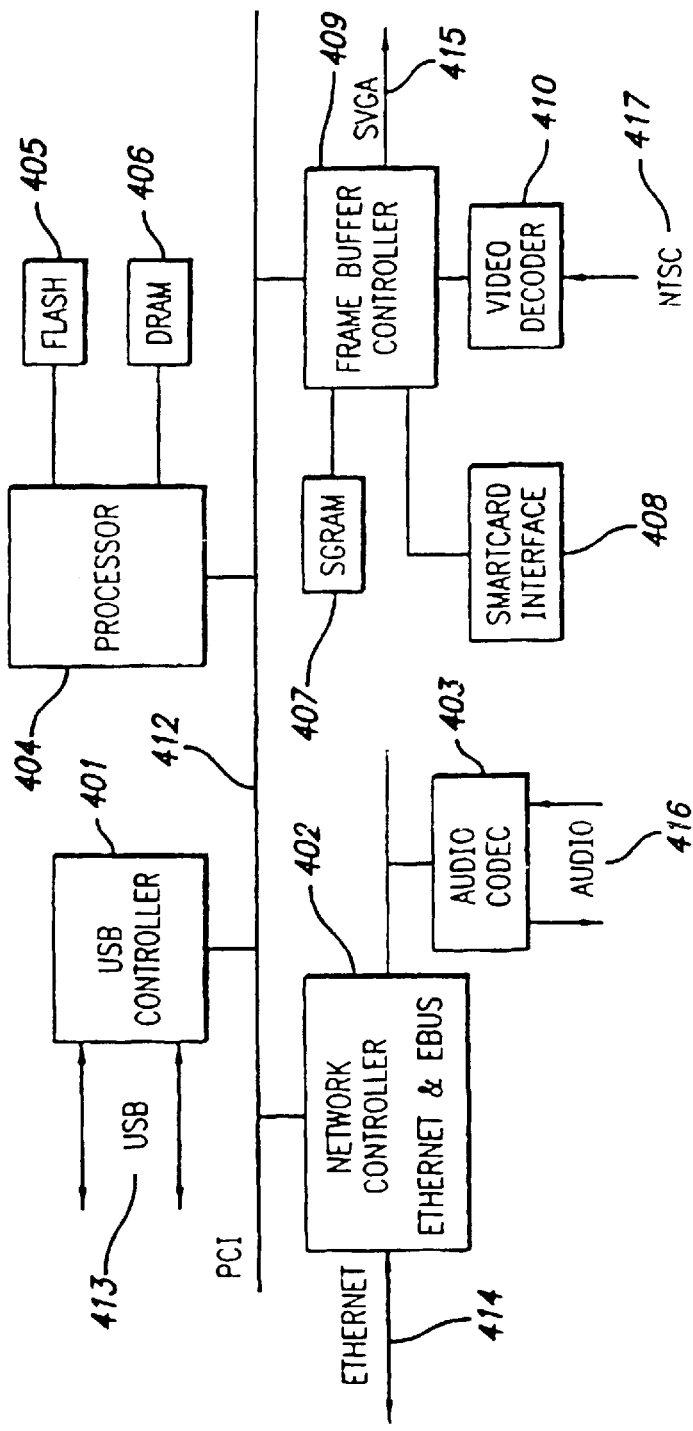
FIG. 4 is a block diagram of one embodiment of an HID of the present invention.

A block diagram of the HID is illustrated in FIG. 4. The components of the HID are coupled internally to a PCI bus 412. A network control block 402 communicates to the interconnect fabric, such as an ethernet, through line 414. An audio codec 403 receives audio data on interface 416 and is coupled to block 402. USB data communication is provided on lines 413 to USB controller 401.

An embedded processor 404 may be, for example, a Sparc2ep with coupled flash memory 405 and DRAM 406. The USB controller 401, network controller 402 and embedded processor 404 are all coupled to the PCI bus 412. Also coupled to the PCI 412 is the video controller 409. The video controller 409 may be for example, and ATI Rage128 frame buffer controller (or any other suitable controller) that provides SVGA output on line 415. NTSC or PAL data is provided into the video controller through video decoder 410. A smartcard interface 408 may also be coupled to the video controller 409.

Figure 5:
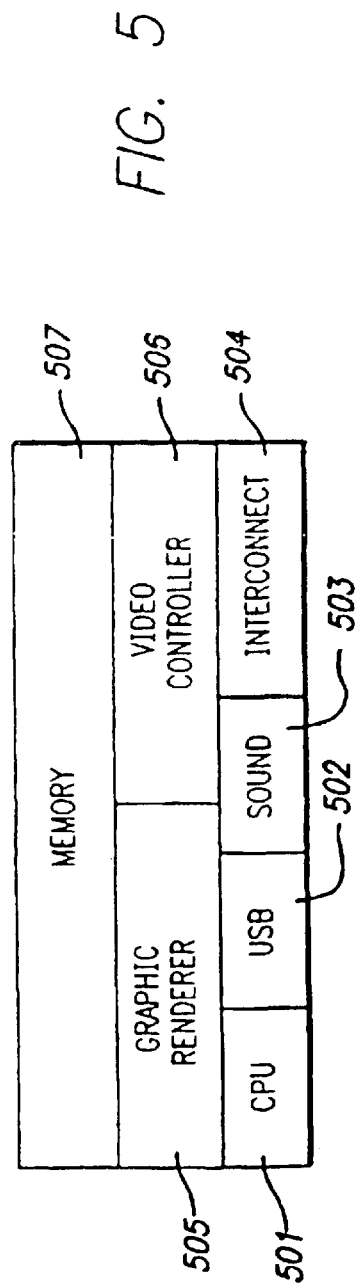
FIG. 5 illustrates a single chip HID embodiment of the present invention.

Alternatively, the HID can be implemented using a single chip solution as illustrated in FIG. 5. The single chip solution includes the necessary processing capability implemented via CPU 501 and graphics renderer 505. Chip memory 507 is provided, along with video controller/interface 506. A universal serial bus (USB) controller 502 is provided to permit communication to a mouse, keyboard and other local devices attached to the HID. A sound controller 503 and interconnect interface 504 are also provided. The video interface shares memory 507 with the CPU 501 and graphics renderer 505. The software used in this embodiment may reside locally in non volatile memory or it can be loaded through the interconnection interface when the device is powered.

Pseudo Device Driver

In the virtual desktop environment described above, the system kernel cannot communicate with a peripheral directly over a bus. Instead, communication occurs through the network fabric to the HID, where the peripheral is connected. The present invention provides a means for communication between the kernel software and the peripheral via a pseudo device driver, remote device driver, and driver service/proxy mechanism.

The pseudo device driver provides an interprocess conduit for a legacy application which expects a kernel interface (e.g. read, write, open, close, ioctl in Unix) to a user-mode service which then communicates with an HID over an interconnect. This enables the legacy application to access devices which are not directly connected to the computer (server) on which it is running, but still act as if they are directly connected.

The pseudo device driver has special functions for managing master and slave ports. These include multiplexing and tracking multiple requesting services, providing multiple families of slave ports, correlating services connected to master ports with slave ports, and creating the correct number of slave device nodes for each service connected to a master port. The pseudo device driver identifies each created slave node to the service on the master port sufficiently for the service to communicate slave identity to prospective applications. The pseudo device driver further notifies the master port when a slave port is opened.

The pseudo device driver has functions that include routing standard data transfers such as those from read and write between the service and the application, maintaining data integrity and order, including any synchronized data transfer semantics. The pseudo device driver converts device control commands (e.g. Unix ioctl) into protocol which are passed on to the service. Likewise, converting protocol from the service into responses to control commands. The pseudo device driver maintains data integrity and ordering, including synchronized device control semantics.

The pseudo device driver optionally caches any state which is set by control commands or by standard operation of the device for rapid access by the application. It initializes any optional cached state, implements any open semantics that are required by the particular device interface (such as device port cloning or exclusive use) and implements any closed semantics that are required by the particular device interface (such as waiting for the device to finish its operation, and timeout on hang). The pseudo device driver propagates standard error handling based on direction from the service.

Figure 2:
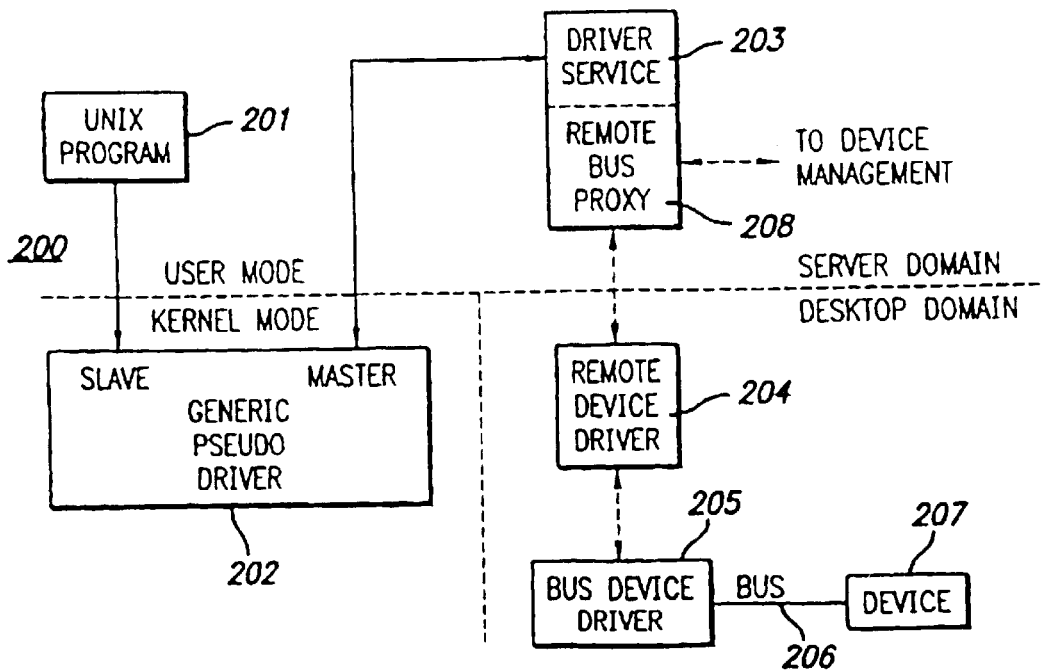
FIG. 2 illustrates an embodiment of the present invention.

An embodiment of the present invention is illustrated in FIG. 2. A peripheral device, such as device 207, is coupled to an HID in the desktop domain via a bus 206. The bus is coupled to a bus device driver at the desktop domain. The bus device driver communicates commands from the device to a generic remote device driver 204, also at the desktop domain.

The remote device driver 204 communicates to the server domain through the network fabric to driver service 203/remote bus proxy 208. The remote device driver is a standard device driver hosted by the bus device driver. The remote device driver, however, emulates a number of device drivers for the purposes of remote access, so it is likely to own all but a few of the devices on the HID. As a result, the remote device driver is responsible for keeping track of which remote driver services go to which devices that are exposed at the bus device driver. Additionally, the remote device driver picks up configuration events from the bus device driver and reports them for possible connection to a driver service. Finally, the remote device driver has the ability to permit and deny device and unit access by driver services. It maintains filters of interested services that are directly connected to it as well as a generic filter to report devices that might not be session-specific. The remote bus proxy 208 is an equivalent interface to the bus device driver that can be used in a similar fashion by multiple services.

Service/proxy 203/208 communicates to a master port of generic pseudo device driver 202 in the system software kernel. An application program, such as Unix program 201, can use the driver via a slave port of the pseudo driver 202.

In operation, the pseudo device driver 202 is resident in kernel software, but is not connected. A driver service 203 is a service which is capable of remotely controlling one or more devices. Driver services control their associated devices using an appropriate bus specific protocol. The driver service uses the remote bus proxy 208 to help structure itself with respect to a session and handling the device protocol.

The remote bus proxy 208 converts function calls into protocol for the remote device driver 204. Since the remote bus proxy 208 handles the remote device driver, its interfaces are necessarily bus-specific. It is responsible for sending requests and data to the remote device driver. It also provides call-back routines for connect and disconnect events, and any other asynchronous event that the bus protocol dictates (e.g. USB interrupts).

The driver service 203 is aware of the master port of the pseudo driver 202. When the driver service 203 is initiated, it interfaces with the pseudo driver 202 via the master port and commands the pseudo driver to create a slave port. The driver service is then able to report the location of the slave port to the application program 201.

When the program 201 needs to access the peripheral 207, it provides commands to the slave port of the pseudo driver 202. The pseudo driver 202 interprets the commands and provides them, via the master port, to driver service 203. Driver service 203, using its associated remote bus proxy 208, communicates with the appropriate remote device driver 204 at the HID of interest. The remote device driver 204 interprets the message from service/proxy 203/208 and sends commands to bus device driver 205. Bus device driver 205 then controls the device 207 with signals on bus 206.

The pseudo device driver is system kernel software that provides the interfaces that a device driver has for obtaining system resources (e.g. objects for accessing memory, including registers) and for otherwise doing any operation on the system. The pseudo device driver does not control the bus 206.

Figure 6:
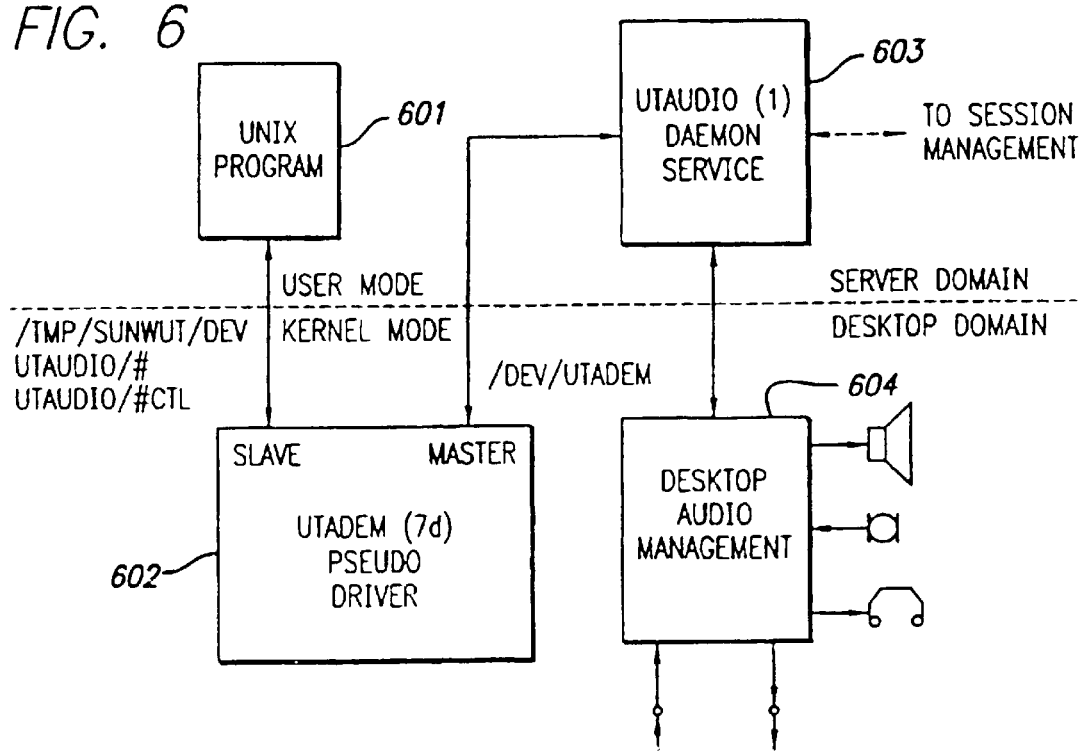
FIG. 6 illustrates an embodiments of the invention.

An example of the present invention is illustrated in FIG. 6. FIG. 6 shows the use of a pseudo device driver in connection with an audio device. A user starts a utaudio service via, for example, a UNIX program 601. There may be multiple users on the network using utaudio service. Each utaudio service creates a utaudio daemon service 603 that opens a master port on the pseudo device driver 602. The master port creates two slaves ports for each master port accessed by a daemon service 603. The slave ports are identified by a temporary file /tmp/SUNWut/dev/utaudio/#. The pseudo device driver maps each daemon to its appropriate temporary file. The UNIX program accesses the daemon driver via the assigned slave ports and routes requests and data to and from the daemon via the slave/master ports and eventually to audio management 604 in the desktop domain.

The pseudo device driver provides an interprocess communication mechanism to convert kernel mode interfaces into messages that go to a user mode service. The pseudo device driver maps between a standard program interface and a device service interface that performs device functions. The pseudo device driver fulfills the need for a supervisor mode interface where one is currently not needed except for the fact that a program interface expects one to be available.

Figure 7:
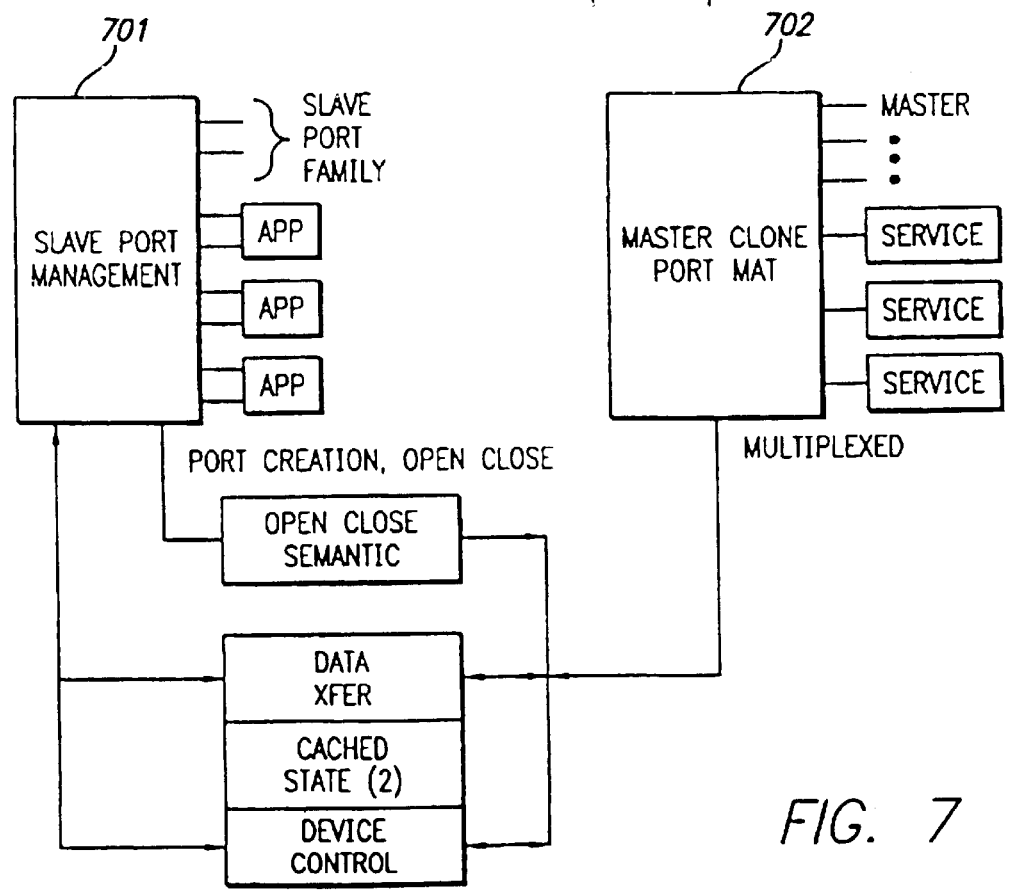
FIG. 7 illustrates the pseudo device driver of the present invention.

FIG. 7 illustrates the pseudo device driver of the present invention. Slave port management 701 manages the connection of the applications to the slave ports. Master clone port manager 702 manages the connection of services to the master ports of the pseudo device driver. The pseudo device driver provides port creation, open and close semantics, data transfer, cached states and device control between the slave port management and master clone port management.

What is claimed is:

1. An apparatus for providing one or more applications with access to one or more devices, comprising:
   a server comprising an application and a driver service, said drive service comprising a plurality of device semantics;
   a pseudo device driver having a slave port and a master port, said pseudo device driver providing an interprocess conduit between said slave port and said master port, wherein said pseudo device driver is configured to perform conversion of device control commands received via said slave port into service protocol for transmission to said drive service;
   an Human Interface Device (HID) comprising a peripheral device, said plurality of device semantics comprising data defining an actual operation of said peripheral device and a data type; and
   an interconnect fabric;
   wherein said driver service of said server is coupled to said peripheral device of said HID via said interconnect fabric;
   wherein said slave port provides a first interface with said application;
   wherein said master port provides a second interface with said driver service; and
   wherein said driver service remotely controls said peripheral device from said server via said pseudo device driver.

2. The apparatus of claim 1, wherein said driver service remotely controls said peripheral device for said application via said pseudo device driver.

3. The apparatus of claim 1, further comprising a system software kernel, wherein said pseudo device driver is resident within said system software kernel, and wherein said first interface comprises a kernel interface based on an operating system.

4. The apparatus of claim 3, wherein said driver service comprises a user-mode service.

5. The apparatus of claim 4, wherein said application comprises a legacy application.

6. The apparatus of claim 5, wherein said user-mode service communicates with said HID via said interconnect fabric and wherein said legacy application accesses said peripheral device of said HID via said kernel interface and said user-mode service.

7. The apparatus of claim 5, wherein said interprocess conduit couples said legacy application to said user-mode service.

8. The apparatus of claim 1, wherein said driver service comprises a plurality of driver services, wherein said master port comprises a plurality of master ports, and wherein said pseudo device driver is configured to multiplex and track each of said plurality driver services on said plurality of master ports.

9. The apparatus of claim 8, wherein said slave port comprises a plurality of slave ports and wherein said pseudo device driver is configured to correlate each of said plurality of driver services on each of said plurality of master ports with an associated one of said plurality of slave ports.

10. The apparatus of claim 1, wherein said pseudo driver is further configured to perform conversion of service protocol from said driver service into responses to control commands for transmission to said slave port.

11. The apparatus of claim 1, wherein said peripheral device comprises a remote peripheral device, wherein said driver service is coupled to said remote peripheral device via a remote device driver for remote accessing, and wherein said remote driver is accessed by said driver service across said interconnect fabric.

12. The apparatus of claim 1, wherein said HID provides a network interface to a user and wherein said server provides a plurality of computational services removed from said HID to said user.

13. The apparatus of claim 12, wherein said plurality of computational services comprise a computational power for said HID and a state maintenance for said HID.

14. The apparatus of claim 13, wherein said HID is a stateless device.

15. A method for providing an application with access to a peripheral device, comprising:
   accessing an application on a server from a Human Interface Device (HID), wherein said HID does not contain any device semantic for controlling said peripheral device;
   receiving, via a slave port of a pseudo device driver, device commands from said application;
   interpreting said device commands;
   providing said interpreted commands in a service protocol to a driver service on said server via a master port of said pseudo device driver, wherein said driver service comprises a plurality of device semantics, said plurality of device semantics comprises data defining an actual operation of said peripheral device and a data type of said peripheral device, and said pseudo device driver is configured to perform conversion of service protocol from said driver service into responses to control commands for transmission to said slave port; and
   controlling said peripheral device on said HID remotely via said driver service on said server across a network;
   wherein said pseudo device driver provides an interprocess conduit from said application to said driver service.

16. The method of claim 15, further comprising:
   initiating said driver service;
   interfacing said driver service with said pseudo device driver via said master port;
   commanding said pseudo device driver to create said slave port from said driver service;
   reporting a location of said slave port to said application from said driver service; and
   caching driver state within said pseudo device driver.

17. The method of claim 15, wherein said receiving step comprises providing a kernel interface to said application via said slave port and wherein said controlling step comprises communicating from said driver service over said network with a remote device driver to control said peripheral device.

* * * * *